(12) United States Patent
VanGilder

(10) Patent No.: US 7,187,380 B2
(45) Date of Patent: Mar. 6, 2007

(54) TELECOMMUNICATIONS GRAPHICAL SERVICE PROGRAM

(75) Inventor: James H. VanGilder, Lake Kiowa, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 53 days.

(21) Appl. No.: 10/701,470

(22) Filed: Oct. 30, 2003

(65) Prior Publication Data

US 2005/0097071 A1    May 5, 2005

(51) Int. Cl.
  *G06T 11/20*    (2006.01)
(52) U.S. Cl. ............... 345/440; 345/418; 345/440.2; 715/762; 715/763
(58) Field of Classification Search ............... 345/418, 345/594, 440, 440.2; 715/762, 763
  See application file for complete search history.

(56) References Cited

U.S. PATENT DOCUMENTS

| | | | | |
|---|---|---|---|---|
| 5,455,853 | A * | 10/1995 | Cebulka et al. | 379/201.03 |
| 6,058,303 | A * | 5/2000 | .ANG.strom et al. | 455/413 |
| 6,185,728 | B1 * | 2/2001 | Hejlsberg | 717/109 |
| 6,253,240 | B1 * | 6/2001 | Axberg et al. | 709/223 |
| 6,272,537 | B1 | 8/2001 | Kekic et al. | |
| 6,571,285 | B1 * | 5/2003 | Groath et al. | 709/223 |
| 6,642,942 | B1 * | 11/2003 | Crook | 715/744 |
| 6,788,315 | B1 * | 9/2004 | Kekic et al. | 715/733 |
| 2003/0051059 | A1 * | 3/2003 | Zondervan et al. | 709/250 |
| 2003/0126584 | A1 * | 7/2003 | Creamer et al. | 717/109 |
| 2004/0153456 | A1 * | 8/2004 | Charnock et al. | 707/10 |
| 2004/0207659 | A1 * | 10/2004 | Goodman et al. | 345/762 |
| 2005/0091576 | A1 * | 4/2005 | Relyea et al. | 715/502 |
| 2005/0094774 | A1 * | 5/2005 | VanGilder | 379/52 |
| 2005/0097512 | A1 * | 5/2005 | VanGilder | 717/113 |

OTHER PUBLICATIONS

System canvas: a new design environment for embeddd DSP and telecommunication systems Praveen K. Murthy, Etan G. Cohen, Steve Rowland Apr. 2001 ☐☐.*
MOBILE: user-centered interface building Angel R. Puerta, Eric Cheng, Tunhow Ou, Justin Min May 1999 ☐☐.*
VISPS, a visual system for plan specification Marco Porta, May 2000 ☐☐.*
Digital canvas: artists and designers in the 2D/3D marketplace R. Carpenter, J. Derry, C. Barry, P. Conn, V. Sorensen, ☐☐Jul. 1989 ☐☐.*
Office Action Correspondence Subsystem (OACS) User's/Training Manual Version 1.3, Copyright Feb. 2003 (Microsoft® Word 2000, Copyright 1983-1999 based software) see, http://ptoweb/patents/oacs/.*
James Thornton: Tcl8.4/Tk8.4 Manual (Extracts) all pub/articles before 2003. Internet http://jamesthornton.com/tcl/8.4.2/.

* cited by examiner

*Primary Examiner*—Kee M. Tung
*Assistant Examiner*—J. Amini

(57) ABSTRACT

In a graphical user interface for a computer, a method of displays objects for designing a service graph using a plurality of service independent building blocks. The method includes displaying a canvas object, displaying a toolbar object, displaying a menu object, and displaying a working folder tabs object that displays in one mode service independent building blocks that may be placed onto the canvas to design a service graph.

20 Claims, 15 Drawing Sheets

TELECOMMUNICATIONS GRAPHICAL SERVICE PROGRAM

TECHNICAL FIELD

The present invention relates generally to telecommunications networks, and more specifically to software for providing desired services on such networks.

BACKGROUND OF THE INVENTION

Modern telecommunications networks provide telephone users with a myriad of features in addition to performing their primary function of placing calls between users. Features such as call waiting, caller identification, and caller call back are now standard features offered by most telephone service provides, and thus the telecommunications networks of these service providers must be configured to support these and other features such as handling calls from wireless users.

FIG. 1 is a functional block diagram of a conventional telecommunications network 100 utilizing a global telecommunications standard known as "SS7," which stands for "Common Channel Signaling System No. 7." The SS7 standard defines protocols for defining how network elements in the public switched telephone network (PSTN) communicate over digital communications networks to provide wired and wireless call setup, routing, and control. The PSTN is the international telephone system that utilizes copper wires and analog signals to represent voice data and place calls between users, and the telephone service provide by this system is known as plain old telephone service (POTS). Thus, the network 100 utilizes network elements of the PSTN in addition to digital communications networks to place calls and provide various advanced features to users.

The network 100 includes service switching points (SSPs) 102 and 104 that operate to originate or terminate calls between users, which are represented by telephones 106, 108. Each SSP 102 and 104 communicates SS7 signaling messages according to the SS7 standard to other SSPs in the network 100 to setup, manage, and release voice circuits in the PTSN required to complete a call. The network 100 further includes signal transfer points (STPs) 110, 112 that route SS7 signaling messages to an appropriate point in the network 100 based on routing information contained in the message. In this way, each STP 110, 112 functions as a network hub and thereby eliminates the need for direct links between points in the network 100. The network 100 further includes service control points (SCPs) 114 and 116, each of which functions as a centralized database that determines how to route particular calls, such as calls having an 800 or 888 area code. In operation, one of the SSPs 102 and 104 originates a query message that is communicated to one of the SCPs 114 and 116. In response to this query message, the SCP 114 and 116 receiving the query message communicates a response message to the originating SSP 102 and 104 that contains routing information associated the call.

A number of service providers typically provide service through the network 100, and these service providers are constantly trying to improve the performance of the network and to add new or enhance existing features for their customers. To make such modifications typically requires a service provider to modify software executing on various points in the network. The software executing on the SSPs 114 and 116 typically provides most of the advanced features offered by a service provider and supported by the network 100, and thus a service provider must modify this software to add or change such features. On behalf of a service provider, a service developer 118 typically accesses computer systems (not shown) forming the SSPs 114 and 116 to modify the appropriate software and thereby modify the services executed by this software.

Each service is a program on the SSP 114 and 116 that executes a particular service logic flow. While these service programs can be written in a variety of different languages, many are based upon a model known as the service independent building block (SIB) model, where SIB is a term defined by the International Telecommunication Union (ITU) Telecommunication Standardization Sector (ITU-T). With this model, an SIB is a unit of service logic that performs a simple function, such as playing an announcement or incrementing a counter, and programs are formed by interconnecting number of SIBs. Libraries of SIBs have been defined, and the SIBs in these libraries are interconnected to form the desired service program and thereby provide the desired service. Associated with each SIB are inputs, outputs, and events, and the SIBs are interconnected using their events. For example, if there are three SIBs designated SIB1, SIB2, and SIB3, and SIB1 generates events A, B, and C, then SIB1 can be connected to SIB2 for event A and to SIB3 for events B and C.

To modify an existing service the service developer 118 must modify the service logic flow defined by the interconnected SIBs forming the corresponding program. Similarly, to develop a new service the service developer 118 must interconnect SIBs to perform the desired service logic flow. Current programs which may be utilized by the service developer 118 to implement desired modifications to an existing service or to develop a new service make the process difficult for a variety of reasons. First, current programs do not provide a sophisticated graphical user interface that allows the developer 118 to easily modify existing and generate new service programs. Also, current programs do not provide the developer 118 with an easy way to reuse repeated service logic sub processes within a given service program and among other service programs. For example, a group of SIBs may be interconnected in the same way in several different locations within the same service program, and may be used a number of different times in different service programs. The developer 118 must independently input this group of SIBs each time required, and test and debug each occurrence to ensure they have been input properly.

Another issue that arises currently with the SIB model involves maintaining proprietary rights in service programs. The interconnected SIBs that collectively form a service program are referred to as a service graph, and this service graph is akin to the source code of the service program. The service developer 118 may not be associated with the service provider and may be developing the service program for sale to a number of different service providers. In this situation, the service developer 118 ideally does not want to provide the service provider with access to the service graph, which represents the key piece of intellectual property generated and owned by the developer 118. Current programs, however, do not provide the developer 118 with an easy way of downloading or "deploying" a developed service program onto the SCP 114 and 116 without providing the serviced provider access to the service graph.

There is a need for a program and system for easily and efficiently designing and deploying service programs written using the SIB model.

SUMMARY OF THE INVENTION

According to one aspect of the present invention, in a graphical user interface for a computer a method of displays objects for designing a service graph using a plurality of service independent building blocks. The method includes displaying a canvas object, displaying a toolbar object, displaying a menu object, and displaying a working folder tabs object that displays in one mode service independent building blocks that may be placed onto the canvas to design a service graph.

BRIEF DESCRIPTION OF THE DRAWINGS

FIG. 6 is a functional diagram showing the process through which service independent building blocks set the values of call variables and thereby set the values of information elements contained in messages transmitted and received by the flexible service logic application program running on the server system of FIG. 2 in accordance with one embodiment of the present invention.

DETAILED DESCRIPTION OF PREFERRED EMBODIMENTS

Figure 2:
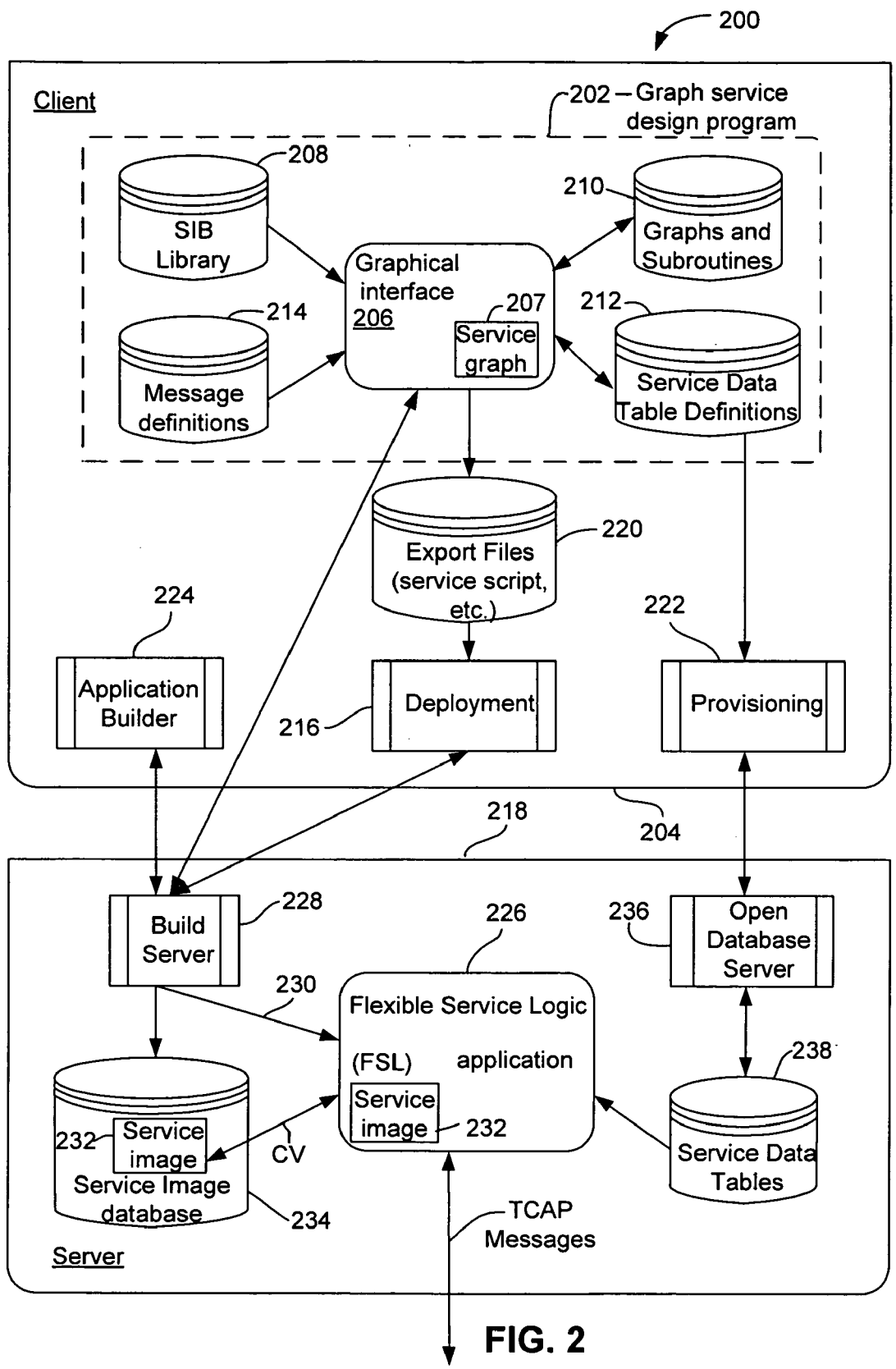
FIG. 2 is a functional block diagram of a telecommunications service creation system including a graphical service design program for graphically defining service logic subroutines of repeated service logic sub processes according to one embodiment of the present invention.

FIG. 2 is a functional block diagram of a telecommunications service creation system 200 including a graphical service design program 202 for graphically defining service logic subroutines corresponding to repeated service logic sub processes according to one embodiment of the present invention. The graphical service design program 202 enables a service developer to easily develop a service logic subroutine graph using a graphical interface, where a service logic subroutine graph corresponds to a number of service independent building blocks (SIBs) interconnected to execute a repeatedly used service logic sub process. For example, within a single telecommunications service program an error handling subroutine may be used in a number of different places and thus would be well suited to being implemented via a subroutine. Another example of a subroutine that may be used in multiple service programs, and thus in multiple services, is a subroutine for validating and loading account information from a service database. In this way, the graphical service design program 202 requires only one subroutine graph be developed and then inserted via a corresponding subroutine icon into a single service graph or into multiple service graphs in as many places as required. This makes developing service programs faster and results in more reliable programs, which lowers the overall cost of developing new service programs. The graphical service design program 202 also provides for easy deployment of a newly developed service program without requiring that a service provider be provided access to the service graph for the service program.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments are within the scope of the present invention. Embodiments including fewer than all the components of any of the described embodiment are also within the scope of the present invention. Finally, the operation of well known operations has not been shown or described in detail below to avoid unnecessarily obscuring the present invention.

In the telecommunications service creation system 200, the graphical service design program 202 executes on a client system 204, which is typically a personal computer. The graphical service design program 202 includes a graphical interface 206 that allows a service developer to design new telecommunications services by selecting desired SIBs from an SIB library 208, placing the selected SIBs onto a work area or "canvas," and then interconnecting the selected SIBs as required to perform a desired service logic process and to thereby create a service graph 207, as will be described in more detail below. The service graph 207 is a graphical representation of a telecommunication service, and is then processed and transferred to a server system 218 on which a flexible service logic (FSL) program 226 executes the processed service graph to thereby provide the underlying service, as will also be explained in more detail below. The SIB library 208 includes a number a standard SIBs that may be utilized by the developer in generating the service graph, with several standard libraries of SIBs being available, such as CAMEL-3-CSCC (CAP), CAMEL-3-MAP, CS1, ETSI INAP, and TTNS SIB libraries, each of which will be familiar to those skilled in the art.

Figure 1:
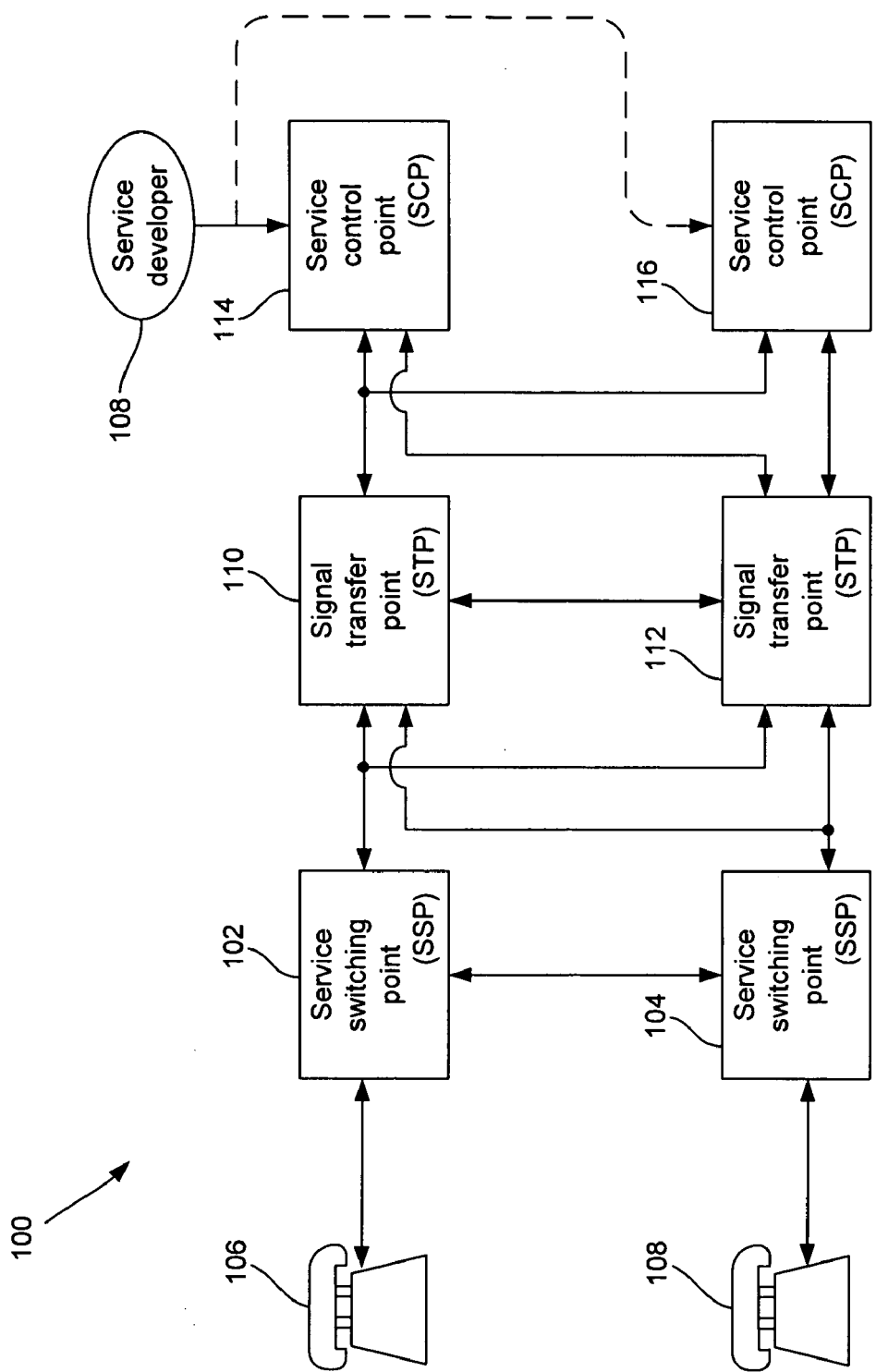
FIG. 1 is a functional block diagram of a conventional telecommunications network using the SS7 standard.

The graphical service design program 202 further includes service graph and subroutine graph files 210, which correspond to graphs created and saved using the program. Each service created using the program 202 has associated service data tables 212 that are utilized to store such information as, for example, subscriber information. During execution of the service, the SIBs forming the service graph 207 read data from and write data to these service data tables 212. A message definition or "message set" 214 is also part of the graphical service design program 202, and is a collection of transaction capabilities applications part (TCAP) messages utilized in an SS7 system as previously described in FIG. 1. Communications between service switching points (SSPs) 102 and 104 (FIG. 1) and service control points (SCPs) 114 and 116 (FIG. 1) occur through TCAP messages. For example, the SSP 102 may send a TCAP message to the SCP 114 to determine a routing number associated with a dialed 800/888 number and to check a personal identification number of a calling card user. Each message in the message set 214 includes a number of fields or information elements IEL and the SIBs forming the service graph 207 utilize call variables CV to write data to and read data from these information elements, as will be described in more detail below. Briefly, the message set 214 defines information elements IEL that make up each message in the message set, and a group of call variables CV are associated with these information elements and are available for use with the service graph 207, with each call variable CV being associated with a corresponding information element. This will be described in more detail below with reference to FIG. 6.

The telecommunications service creation system 200 further includes a deployment program 216 contained on the client system 204. The deployment program 216 processes the service graph 207 created using the graphical interface program 206 to create files suitable for transfer to a server system 218, which executes these files to thereby provide the underlying telecommunications service. More specifically, once a service graph 207 has been generated with the graphical interface program 206, the service graph is "deployed" or "cutover" to the server system 218 using the deployment program 216. The service developer controls the interface program 206 to generate exported files 220 from the service graph 207, where the exported files include a service script along with other files necessary for deployment of the service graph. The deployment program 216 uses only the exported files 220, which may be useful when deploying the same service to multiple server systems 218 or when providing services to service providers without actually supplying the developed service graphs 207 to such service providers. In this way, the deployment program 216 provides a convenient and secure way for a service developer to design a service and to thereafter distribute the files corresponding to the designed service to customers without disclosing proprietary intellectual property contained in the service graph 208. The development program 216 also provides a convenient and secure way for the developer to deploy the service on the server system 218. The interface program 206 may also directly cut over the service graph 207 to the server system 218 without using the deployment program 216.

A provisioning program 222 on the client system 204 is used to add data to service data tables contained on the server system 218 and which are created according to the service data table definitions 212 utilized by the service graph 207. Also contained on the client system 204 is an application builder program 224, which is used to generate the FSL application program 226, which, as previously mentioned, is an executable program that runs on the server system 218 to execute the underlying telecommunications service. The application builder program 224 allows a service developer to generate, from the client system 204, the FSL application program 226 that is to run on the server system 218.

On the server system 218, a build server 228 operates to perform several functions. First, the build server 228 operates in conjunction with the application builder 224 to generate the FSL application program 226. More specifically, the application builder 224 is used to select particular SIB libraries 208, and the application builder then communicates with the builder server 228 to bind an application framework (not shown) residing on the server system 218 with the selected SIB libraries to generate the FSL application program 226, as indicated by an arrow 230 in FIG. 2. The server system 218 runs on an SCP 114 and 116 in the SS7 network 100 in FIG. 1, and the application program 226 communicates with other points (not shown) in the network through TCAP messages, as indicated in FIG. 2. The service image 232 communicates with the application program 226 through call variables CV to set the value of a corresponding information element in a TCAP message, as will be discussed in more detail below.

The build server 228 also operates to communicate with either the graphical interface program 206 or the deployment program 216 to compile the service script received from either of these two programs. During deployment of the service graph 207, either the graphical interface program 206 or the deployment program 216 communicates with the build server 228 and transfers the service script corresponding to the service graph 207 to the build server. The build server 228 compiles the received service script to thereby generate a corresponding service image 232 that is stored in a service image database 234 on the server system 218. To execute the underlying service, the FSL application 226 executes the service image 232, as indicated by the dotted lines showing the service image in the application program.

The server system 218 further includes an open database server 236 that operates, during cutover of the service graph 207, to create any service data tables required for the associated service and stores these service data tables in a service data table database 238. Once these service data tables are created and stored in the service data table database 238 on the server system 218, the provisioning program 222 communicates with the open database server 236 to insert data into these tables. The provisioning program 222 can also be used to independently create the required service data tables and store these tables in the database 238 prior to cutover.

Figure 3:
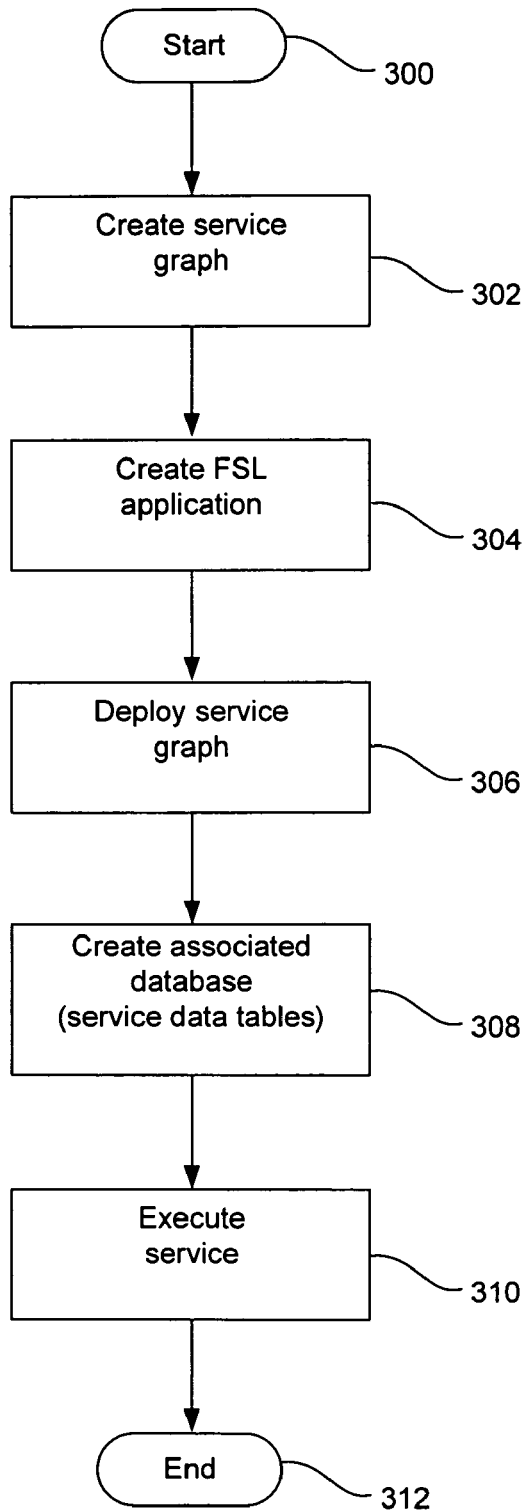
FIG. 3 is a flow chart illustrating an overall process executed by the telecommunications service creation environment of FIG. 1 in creating and deploying a telecommunications service in accordance with one embodiment of the present invention.

The overall process executed by the telecommunications service creation system 200 in creating and deploying a telecommunications service will now be described in more detail with reference to FIG. 2 and to the flow chart of FIG. 3. The process starts in step 300 and proceeds immediately to step 302 in which the graphical interface program 206 is utilized to develop the service graph 207 corresponding to the desired telecommunications service. As previously mentioned, to create the service graph 207 a service developer selects appropriate SIBs from the SIB library 208, places them on a screen or canvas displayed by the program, and interconnects the SIBs as required to execute the desired service logic process.

Once the service graph 207 is created in step 302, the FSL application program 226, in step 304, is created on the server system 218 using the application builder 224 and build server 228. After the FSL application program 226 has been created in step 306, the service graph 207 created in step 302 is cut over or deployed either directly using the graphical interface 206 or using the deployment program 216. During the deployment process, the build server 228 receives a service script corresponding to the developed service graph 207 and compiles the received service script to generate the corresponding service image 232, which is stored in the service image database 234 on the server system 218.

In step 308 the service data table database 238 on the server system 218 is created using the provisioning program 222 on the client system 222 and the open database server 236 on the server system. The provisioning program 222 communicates with the open database server 236 to insert data into the service data tables after deployment of the service graph 207 in step 306. Alternatively, the provisioning program 222 can also be used to independently create the required service data tables and store these tables in the database 238 prior to deployment of the service graph 207, in which case step 308 would occur prior to step 306.

The process goes to step 310 and the FSL application program 226 executes the service image 232 to thereby execute the designed service. During execution of the service, the FSL application program 226 and service image 232 communicate via call variables CV to transfer values contained in the TCAP messages sent and received by the FSL application program. Those skilled in the art will appreciate that the particular order in which the steps of the process of FIG. 3 are executed may vary.

Figure 4:
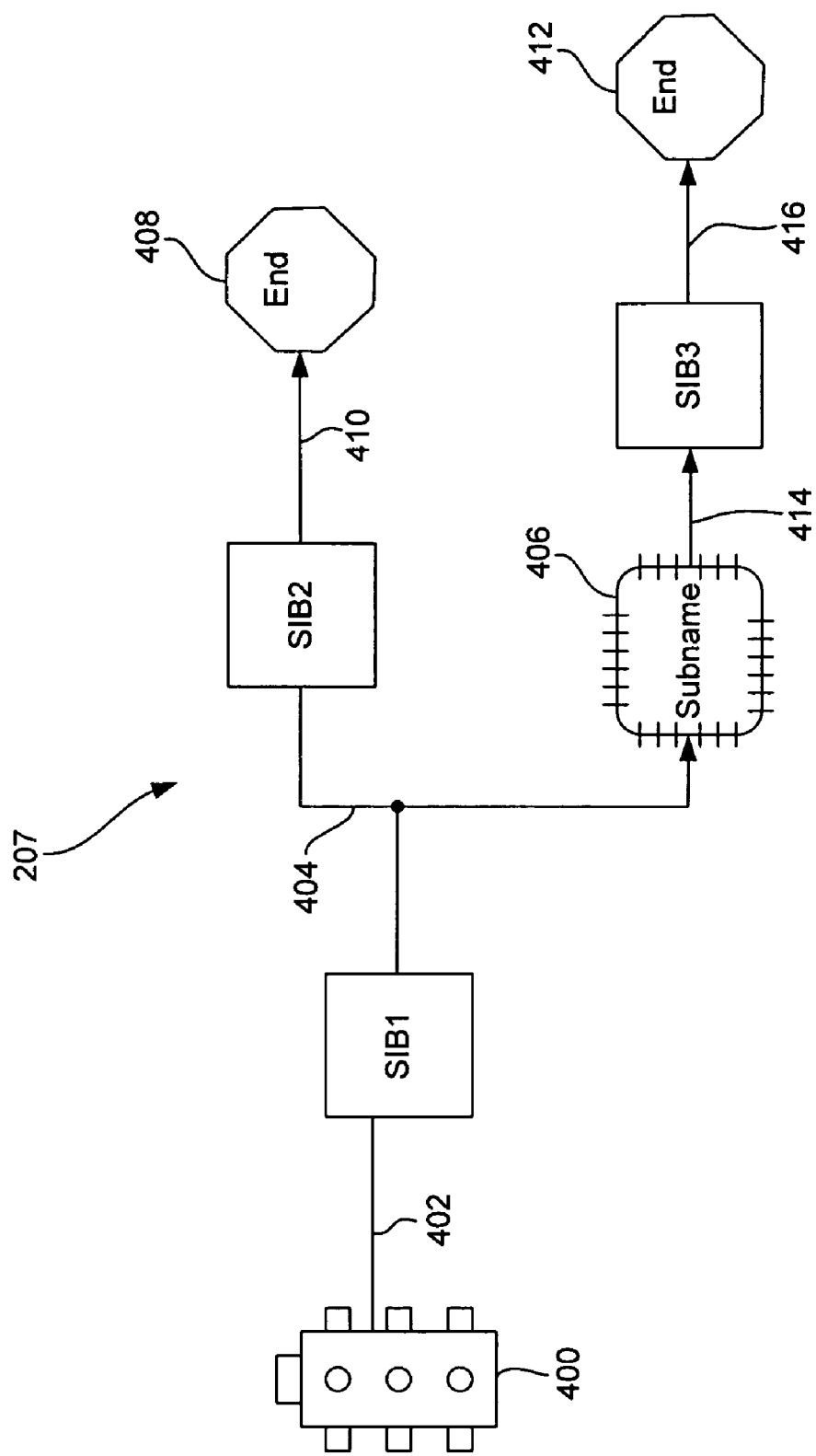
FIG. 4 is a functional block diagram of an example of a service graph generated by the graphical service design program of FIG. 2, where the service graph is a graphical representation of a telecommunications service executed by a flexible service logic application program running on a server system of FIG. 2 in accordance with one embodiment of the present invention.

FIG. 4 is an example of the service graph 207 and shows a number of SIBs interconnected to form a desired service logic process. Each time an SIB is placed on the canvas an "instance" of that SIB is created and is represented in the service graph 207 by a corresponding icon. In the present description, the term "SIB" as used herein is used to refer to the function performed by the SIB or to the icon representing the SIB, or both.

In the example of FIG. 4, a start SIB 400 indicates the start of the service logic process and a sample SIB designated SIB1 is coupled to the start SIB 400 through a link 402. The SIB1 is also coupled through a link 404 to a second sample SIB designated SIB2 and to a subroutine 406 represented by a corresponding icon. An end SIB 408 is linked to SIB2 through a link 410 and a third sample SIB designated SIB3 and another end SIB 412 are coupled in series through respective links 414, 416 to the subroutine 406 as shown. The subroutine 406 is a group of SIBs (not shown) that execute a desired service logic sub process that is repeatedly used within a give service logic process or among different service logic processes, as will be described in more detail below.

Figure 5:
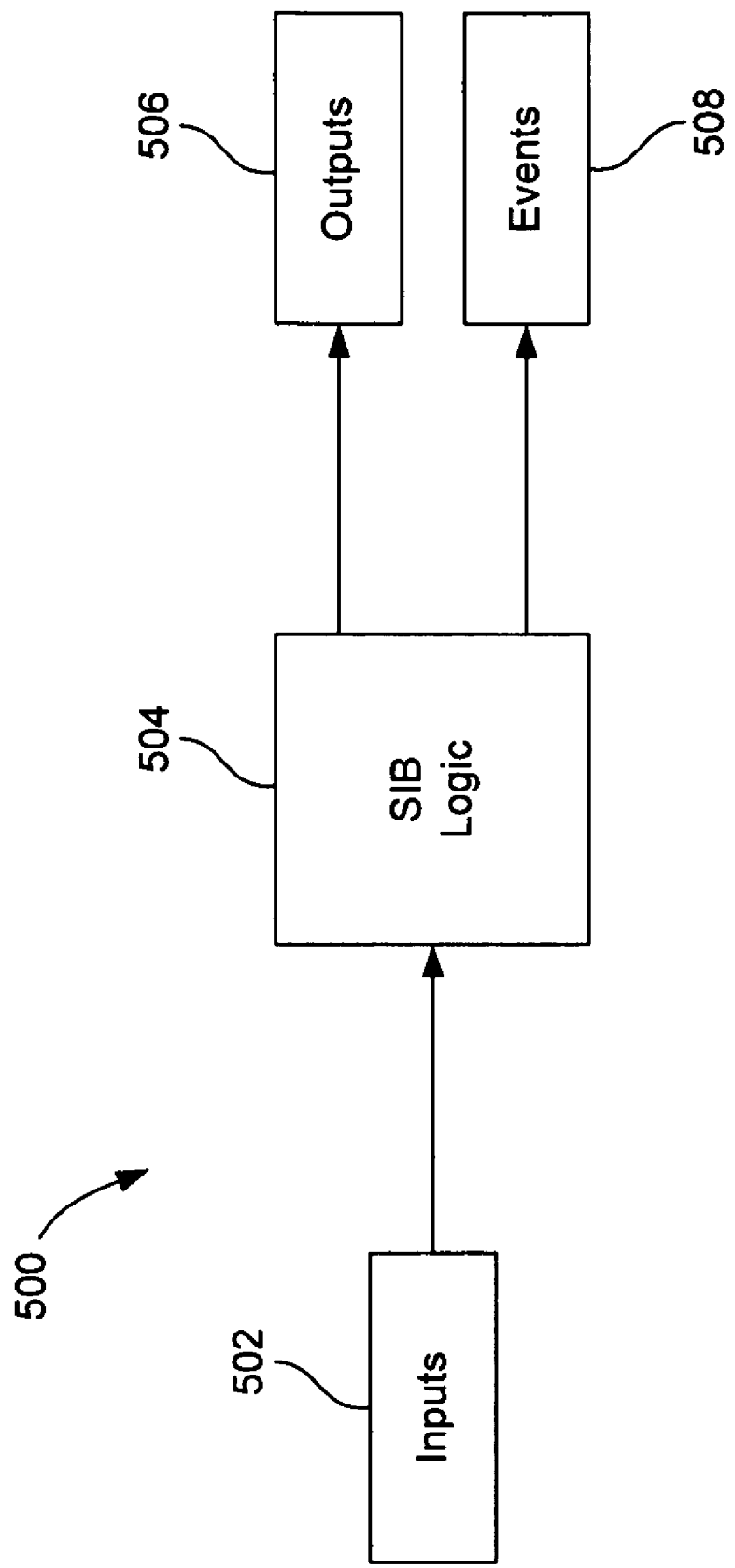
FIG. 5 is a functional block diagram illustrating in more detail the components of a service independent building block of FIG. 4 in accordance with one embodiment of the present invention.

FIG. 5 is a functional block diagram illustrating in more detail the components of a typical SIB 500 corresponding to any of the SIB1–SIB3 of FIG. 4. The SIB 500 includes inputs 502 that are applied to SIB logic that executes the simple function of the SIB, where each input is assigned to a corresponding call variable. As previously mentioned, call variables CV are used in communicating information between the service corresponding to the service graph 207 and TCAP messages being communicated by the FSL application program 226. The SIB 500 further includes outputs 506, each of which is also assigned to a corresponding call variable. Finally, the SIB 500 includes events, which are parameters that are communicated from one SIB to another via links and which control the logic flow within the service graph 207. For example, in FIG. 4 the link 404 defines events that are communicated to SIB2 and to the subroutine 406, and the values of these events may, for example, determine whether the subroutine executes to perform a first function or whether the SIB2 executes to perform a second function.

Figure 6:
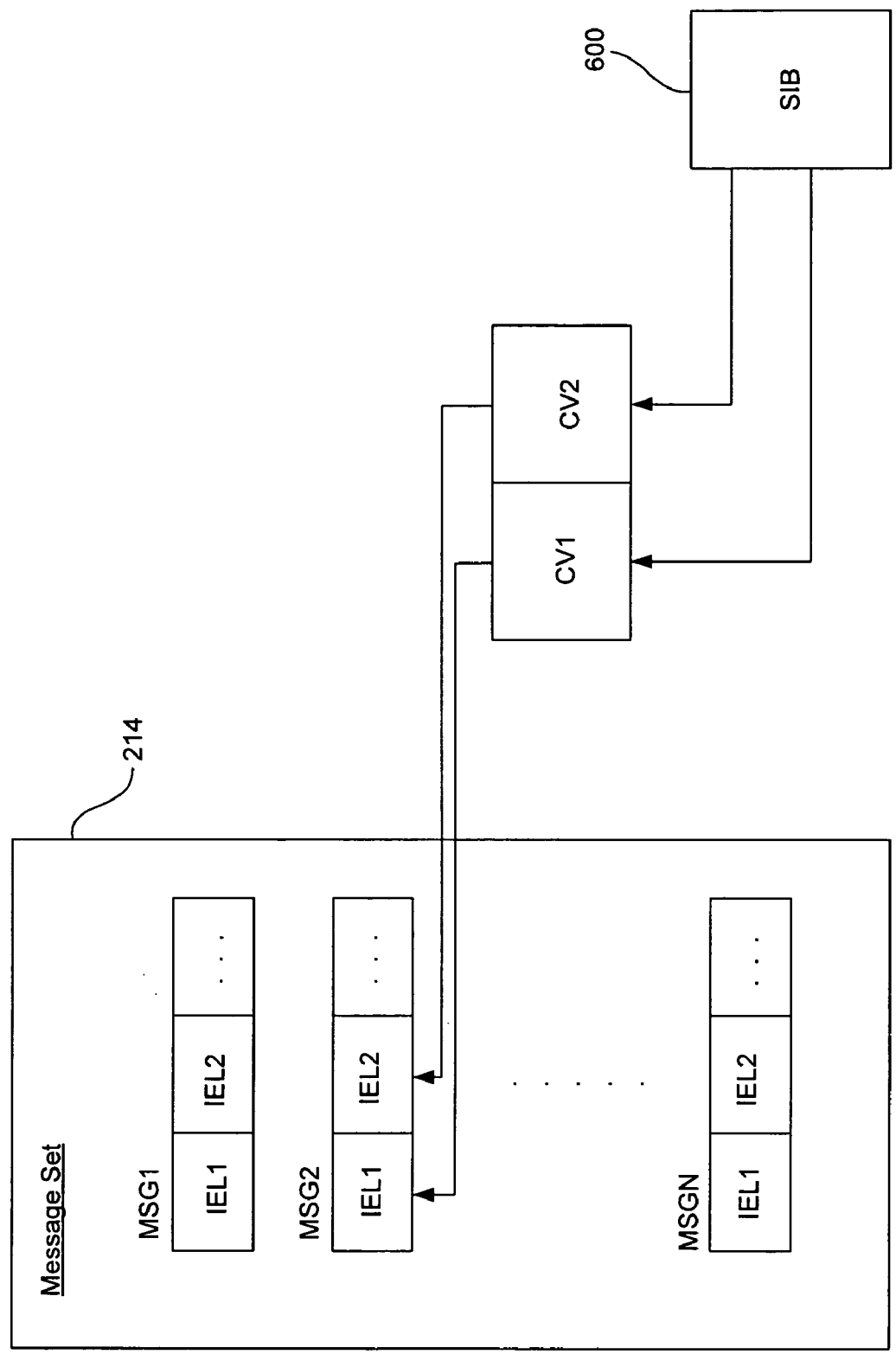
FIG. 6 is a diagram showing a display presented by the graphical service design program of FIG. 2 for configuring a sample service independent building block.

FIG. 6 is a functional diagram showing the process through which SIBs set the values of call variables CV which, in turn, set the values of information elements IEL contained in TCAP messages transmitted and received by the FSL application program 226. In the example of FIG. 6, an SIB 600 has two outputs and each output is assigned to a respective call variable CV1, CV2. To set the value of an information element IEL in a TCAP message, the SIB 600 sets the values of the call variables CV1, CV2 As previously mentioned, the service image 232, which is a compiled version of the service graph 207 containing the SIB 600, communicates with the FSL application program 226 through call variables CV. In response to the call variables CV1, CV2, the FSL application 226 modifies the information elements IEL in the appropriate message in the message set 214 associated with the underlying service. In FIG. 6, the message set 214 is shown as including a number of individual messages MSG1–MSGN, each message including a number of information elements IEL. The call variables CV1 and CV2 are associated with information elements IEL1 and IEL2 in the message MSG2, and the SIB 600 sets the values of these information elements through the process variables CV1 and CV2.

Figure 7:
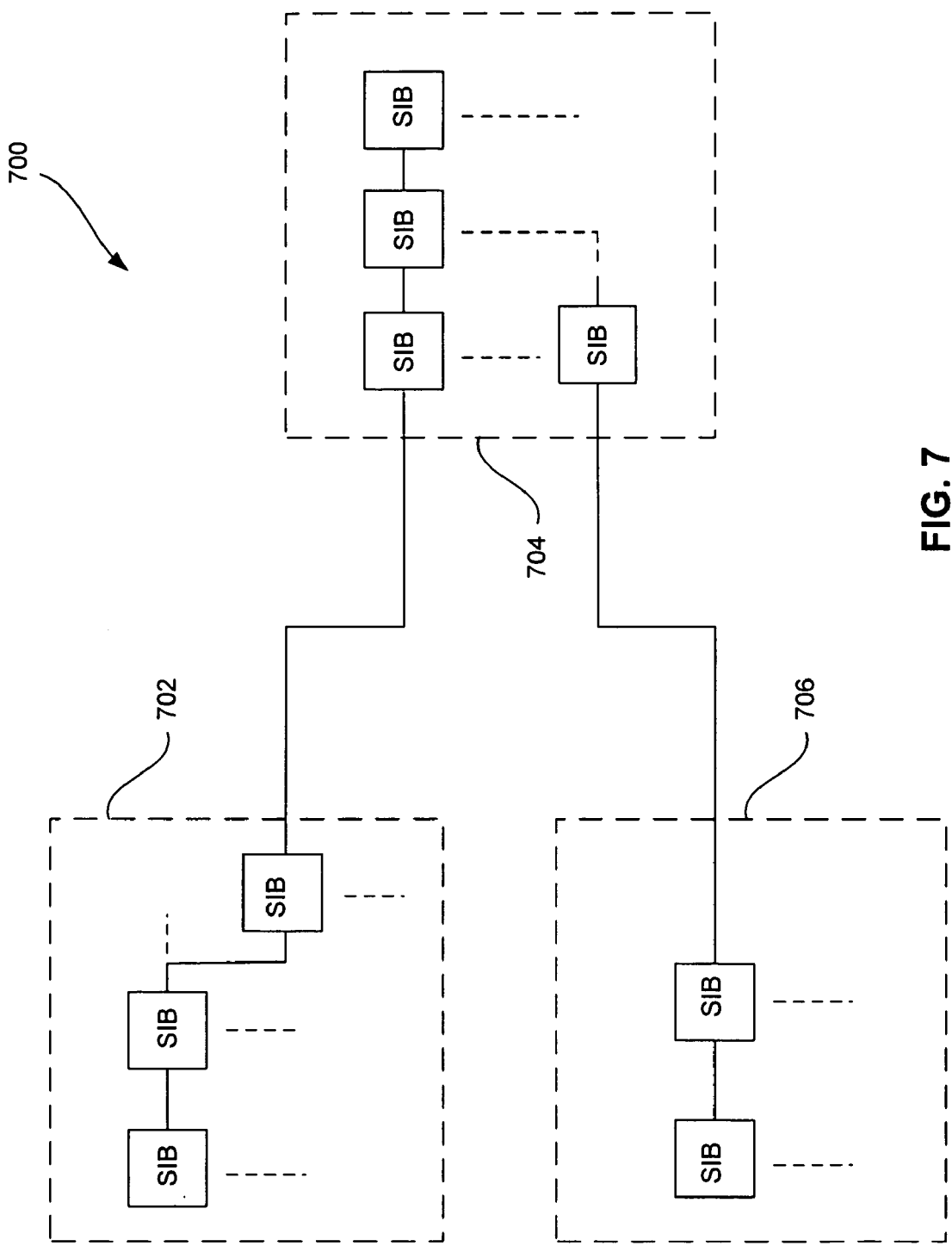
FIG. 7 is a functional block diagram of a typical service graph including several repeated service logic sub processes that may be implemented via respective subroutines generated by the graphical service design program of FIG. 2 in accordance with one embodiment of the present invention.

FIG. 7 is a functional block diagram of a typical service graph 700 including several groups 702–706 of SIBs, each group of SIBs being a repeated service logic sub process that may be implemented via a respective subroutine generated by the graphical service design program 202. The group 702 could, for example, be a group of SIBs that execute an error handling routine used in multiple instances within the single service graph 700. This error handling routine is well suited to being implemented through a subroutine. The group 704 could, for example, be a group of SIBs that execute a routine to validate and load account information from the service database 238 (FIG. 2). This is routine may be used in a number of different service graphs 700, and thus is similarly well suited to being implemented through a subroutine.

Figure 8:
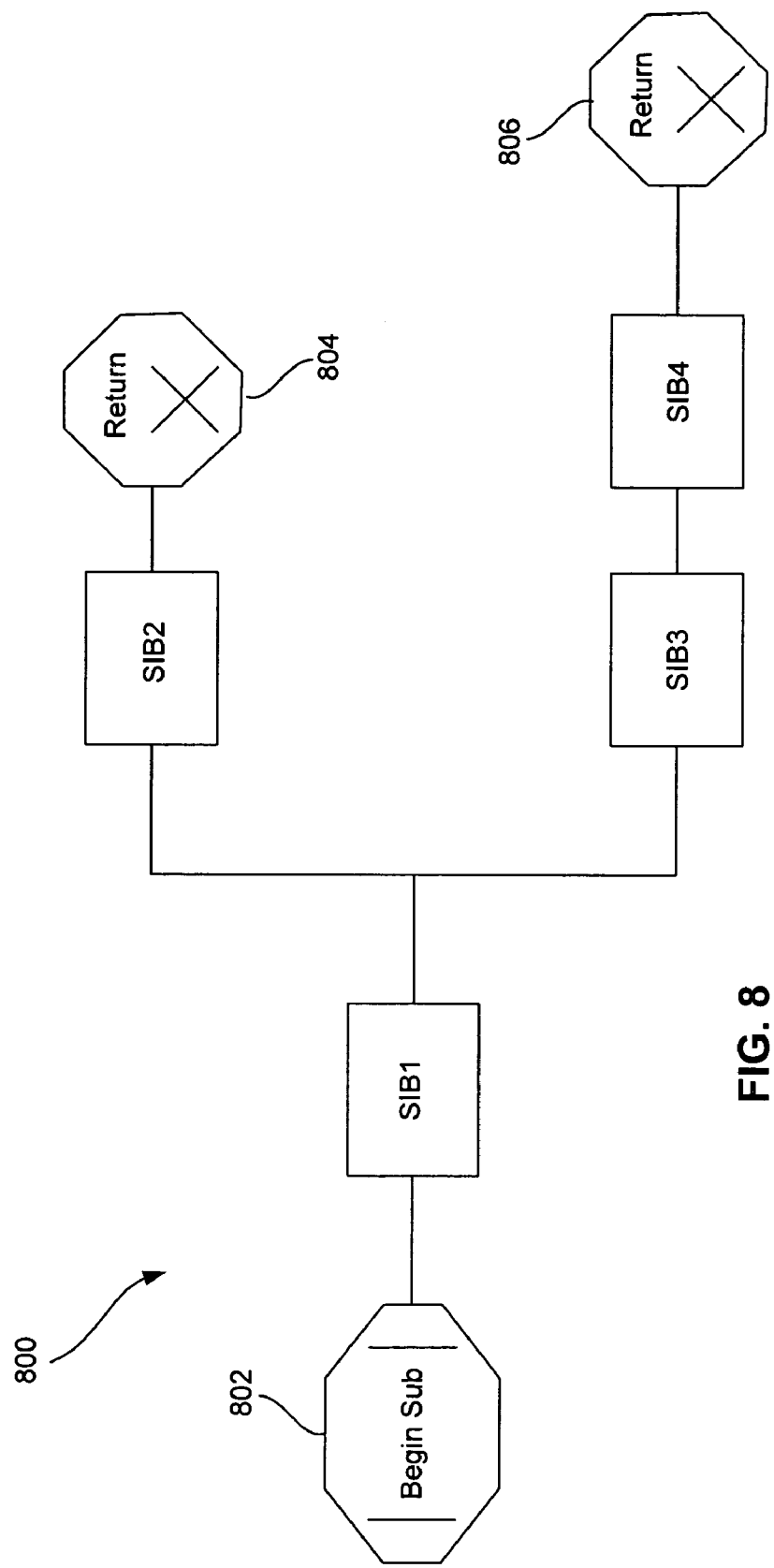
FIG. 8 is a functional block diagram of a subroutine graph showing a generic subroutine formed by a number of interconnected service independent building blocks according to one embodiment of the present invention.

The graphical interface program 206 creates subroutines in much the same way as creating the service graph 700 corresponding to an overall service process. Thus, to create a subroutine the graphical interface program 206 is used to create a subroutine graph, an example of which is shown as a subroutine graph 800 in FIG. 8. The SIBs contained in the subroutine graph 800 can be selected and inserted as previously described for the service graph 207 of FIG. 4, or can be copied from portions of other service graphs. In a service graph, each subroutine is represented with a distinct icon designated the call subroutine icon, an example of which is shown for the subroutine 406 in FIG. 4.

The subroutine graph 800 represents a service logic sub process that is then called by the service graph 207 or 700. In the following description, the only the example service graph 207 will be referred to for ease of explanation. The graphical interface program 206 is used to create the subroutine graph 800 in much the same way as the service graph 207 would be created. A new subroutine is selected to open a new subroutine canvas, and SIBs are then selected and placed on the canvas to create particular instances of such SIBs. These SIBs are thereafter interconnected through links as required to perform the desired service logic sub process. Each subroutine graph 800 includes special SIBs associated only with subroutine graphs, namely a begin subroutine SIB 802 that indicates the start of a subroutine graph and one or more return SIBs 804, 806 indicating the end of a particular logic flow within the subroutine graph where control is returned to the service graph 207 calling the subroutine graph. In addition to the begin subroutine SIB 802 and return SIBs 804, 806, the SIBs required to perform the desired service logic sub process are also inserted into the subroutine graph 800 and are designated SIB1–SIB4 and interconnected as shown in this example.

In addition to creating instances of the required SIBs, the graphical interface program 206 is also used to define a name, inputs, outputs, and events for the subroutine graph 800. Note that the terms subroutine and subroutine graph may be used interchangeably herein. The name assigned to the subroutine graph 800 is displayed in the corresponding icon shown in the service graph 207. The inputs are any inputs to the subroutine graph 800 that may be set by the calling service graph 207, while the outputs are parameters that are returned to the calling service graph. Similarly, events of a subroutine graph 800 are the events that can be returned to the calling service graph 207, and are returned to the calling service graph by the return SIBs 804, 806. Each return SIB 804, 806 has no output events of its own, but instead returns one of the events defined for the subroutine graph 800. Where there is more than one return SIB 804, 806, as is obviously the case in the graph 800, each return SIB can return the same or a different event.

Once a subroutine graph 800 is defined using the graphical interface program 206, the program displays a call subroutine SIB or icon that allows a developer to create instances of the subroutine where desired in service graphs 207. As previously mentioned, an example of a call subroutine SIB is shown for the subroutine 406 of FIG. 4. Instances of the subroutine may thus be created, for example, by clicking on the corresponding icon displayed on a working tab panel displayed by the program 206 and then dragging the icon to the canvas displayed by the program.

In one embodiment of the program 202, the graphical interface program 206 allows the subroutine graph 800 to be called from multiple service graphs 207 and also to be called from other subroutine graphs, but does not allow a subroutine graph to be called recursively (i.e., a subroutine graph cannot call itself) and also does not allow a subroutine graph called by another subroutine graph to call that original subroutine graph (i.e., if subroutine A calls subroutine B, then subroutine B cannot call subroutine A).

In this way, the graphical service design program 202 requires only one subroutine graph 800 be developed and then inserted via a corresponding subroutine icon into a single service graph 207 or into multiple service graphs in as many places as required. Telecommunications services may therefore be developed faster using the program 202. Moreover, the use of subroutine graphs 800 will make new services more reliable since once a subroutine graph is designed and validated as operating properly, the service logic sub process executed by the subroutine graph will not again need to be checked when validating an overall service graph containing the subroutine.

Figure 9:
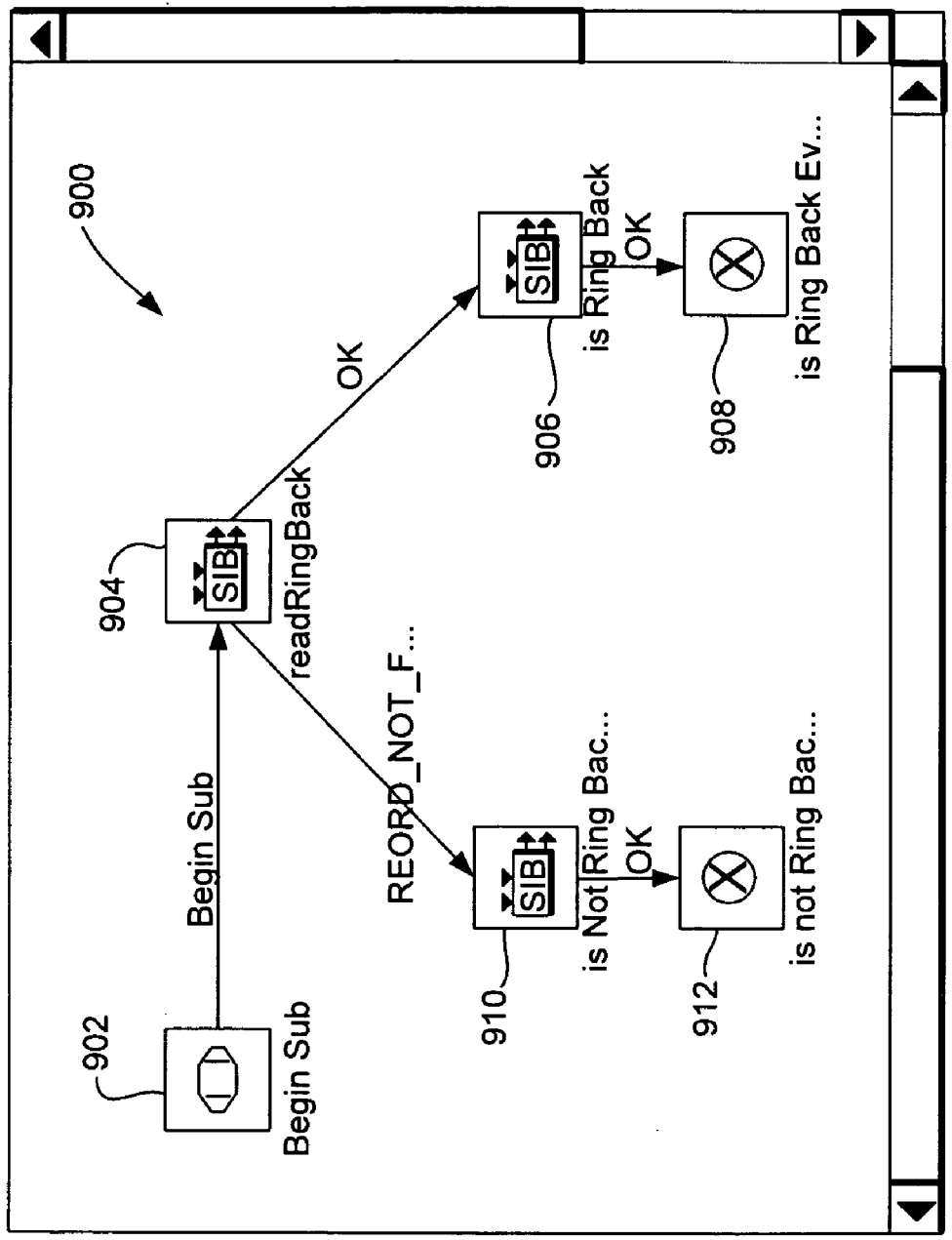
FIG. 9 is an example subroutine graph of a ring back subroutine that determines if a number is a ring back number, as may be used in telephone system features such as calling back the last number that called you in accordance with one embodiment of the present invention.

FIG. 9 is an example subroutine graph 900 of a ring back subroutine that determines if a number is a ring back number, as may be used in telephone system features such as calling back the last number that initiated the call and which is commonly known as the "*69" feature. The subroutine graph 900 includes a begin subroutine SIB 902 which is linked to a read ring back SIB 904. The read ring back SIB 904 determines whether the number is a call back number, and provides a ring back indicator having a value indicating the results of this determination. If the SIB 904 determines the number is a ring back number, then the SIB sets the ring back indicator value to true and in response to this true indicator an "is ring back" SIB 906 sets a true "is ring back" event. A return SIB 908 returns the true "is ring back" event to the calling service graph (not shown). If the SIB 904 determines the number is not a ring back number, then the SIB sets the ring back indicator value to false and in response to this false indicator an "is not ring back" SIB 910 sets a true "is not ring back" event. A return SIB 912 returns the true "is not ring back" event to the calling service graph (not shown).

Figure 10:
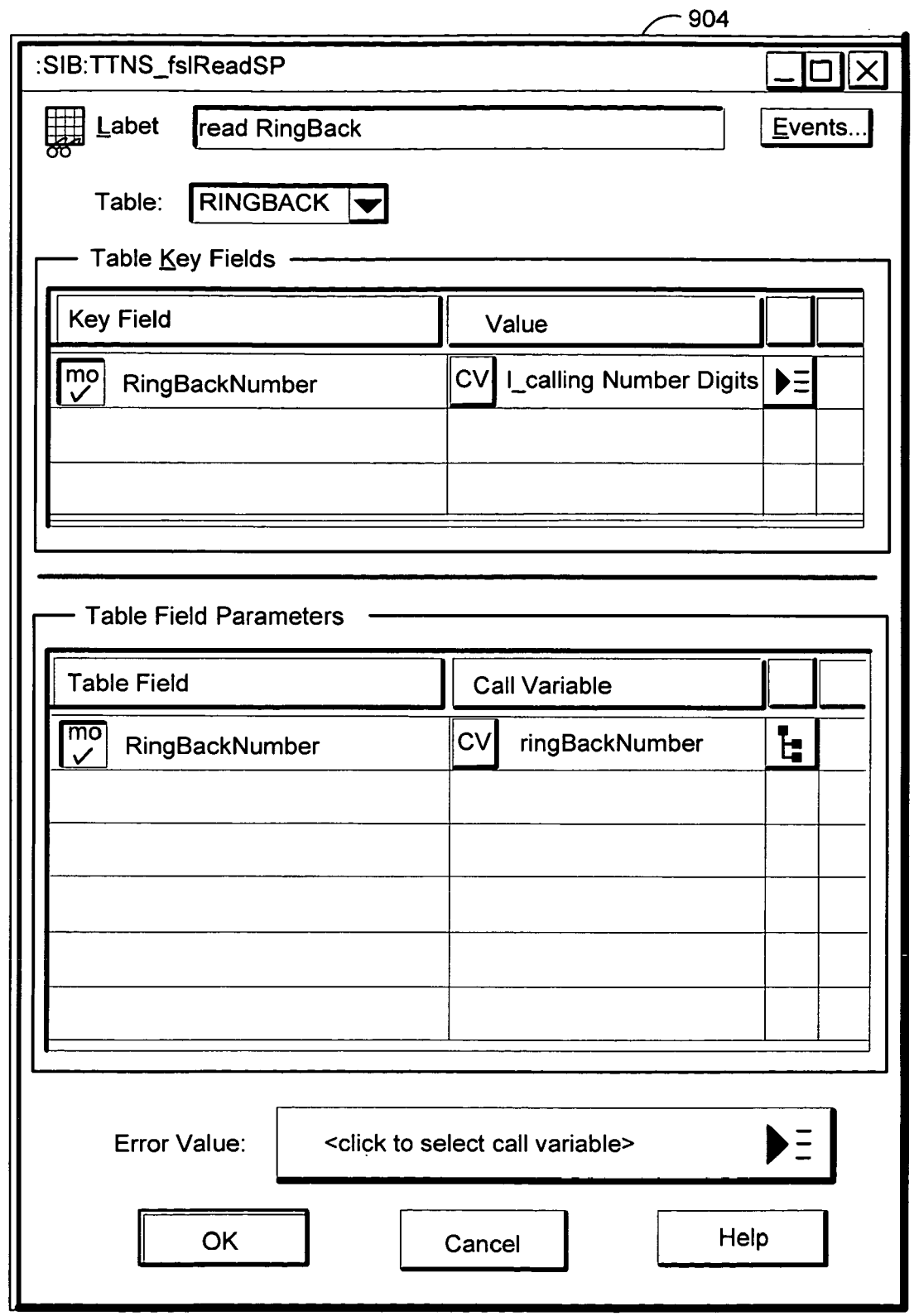
FIG. 10 is a diagram showing a display presented by the graphical service design program of FIG. 2 for configuring the service independent building block in the subroutine graph of FIG. 9 that looks up a phone number in a database table in accordance with one embodiment of the present invention.

FIG. 10 is a diagram showing a display 1000 presented by the graphical interface program 206 of FIG. 2 for the read ring back SIB 904 of FIG. 9. The display 904 allows a service developer to configure the SIB 904 as required. The display shows the SIB 904 uses a control variable "ringBackNumber" to determine whether a number is a call back number.

Figure 11:
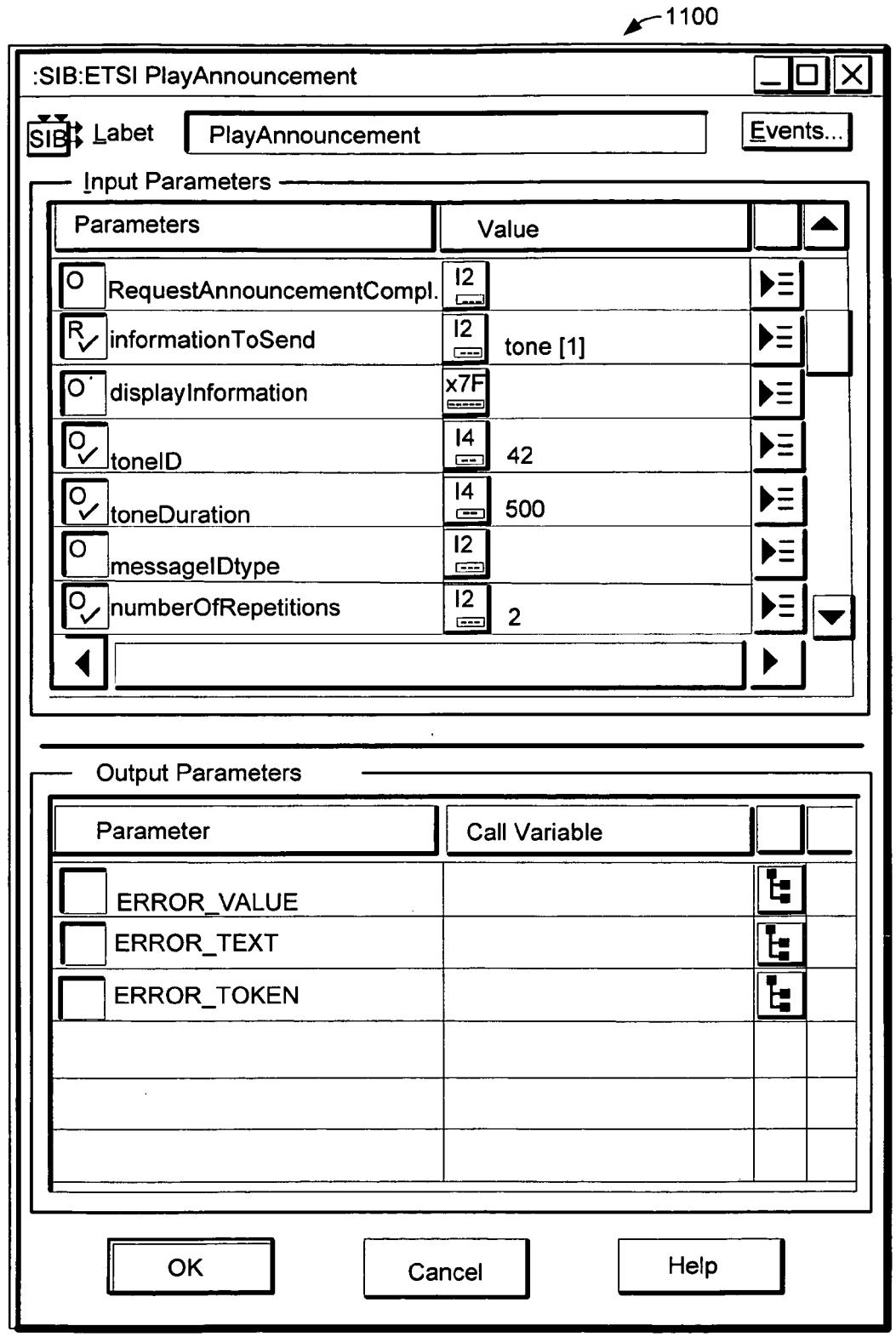
FIG. 11 is a diagram showing a display presented by the graphical service design program of FIG. 2 for configuring an example service independent building block in accordance with one embodiment of the present invention.

FIG. 11 is a diagram showing a display 1100 presented by the graphical interface program 206 of FIG. 2 for an example "PlayAnnouncement" SIB. The display 1100 shows the input and output parameters associated with the SIB. Each input parameter is indicated as being required or optional through an associated "R" or "O" in the far left column for the parameter, and values for the required input parameters are indicated. Three output parameters are shown and an appropriate call variable CV may be assigned to each, although in the display no such call variables are shown as being assigned.

Figure 12:
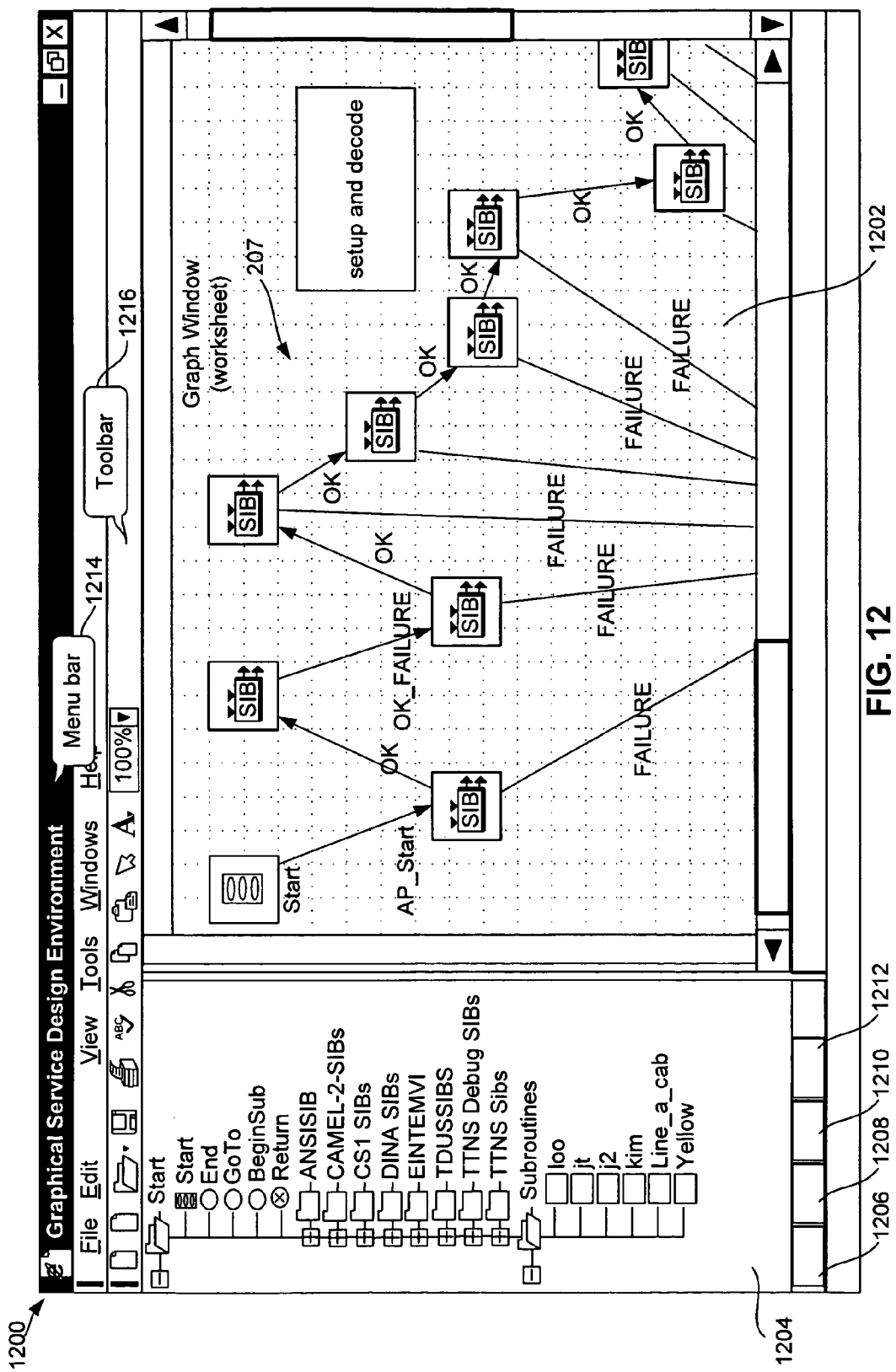
FIG. 12 shows a graphical design window displayed by the graphical interface program of FIG. 2 according to one embodiment of the present invention.

FIG. 12 shows a graphical design window 1200 displayed by the graphical interface program 206 of FIG. 2 for generating the service graph 207 according to one embodiment of the present invention. The graphical design window 1200 is part of a graphical user interface of the interface program 206 through which a service developer provides inputs to develop the service graph 207. The graphical design window 1200 includes a canvas portion or object 1202 in which the developer places SIBs and subroutines and interconnects these icons to form the service graph 207. A number of SIBs are shown in the canvas object 120 in the example of FIG. 12.

The graphical design window 1200 further includes a working folder tabs object 1204 positioned to the left of the canvas object 1202. The working folder tabs object 1204 includes an SIB button or pane 1206, a services pane 1208, a service data tables pane 1210, and a messages pane 1212 which determine the content displayed by the working folder tabs object. When the SIB pane 1206 is selected by clicking on the pane, the working folder tabs object 1204 displays the currently available SIB libraries and the SIBs in each library, as shown in FIG. 12. When the services pane 1208 is selected, the working folder tabs object 1204 displays icons representing the service graphs 207 and icons representing the subroutine graphs 800. The developer may then select a graph 207 or 800 to open the graph, meaning the graph is displayed in the canvas object 1202 to be viewed and/or modified by the developer. Selecting the service data tables pane 1210 causes the working folder tabs object 1204 to display any service data tables 212 currently available for use by the developer. Finally, when the messages pane 1212 is selected the working folder tabs object 1204 displays icons representing the message sets 214 (FIG. 6) currently available for use as well as the messages MSG in each message set.

The graphical design window 1200 further includes a menu object 1214 that allows the developer to select from among several familiar menus including a "file" menu, "edit" menu, "view" menu, and "tools" menu. Below the menu object 1214 in the embodiment of FIG. 12 is toolbars object 1216 that may include several different toolbars. The toolbars object 1216 may include a standard toolbar corresponding to the first nine buttons starting from the leftmost button in the toolbar object 1216. The service developer uses the standard toolbar to perform basic operations such as opening an saving files. A graph toolbar may also be included in the toolbars object 1216, and corresponds to the remaining buttons shown for this object in FIG. 12. The graph toolbar is used to perform the most common operations performed in developing a service graph 207, such as linking SIBs and selecting instances of SIBs in the canvas object 1202. The toolbars object 1216 may include other toolbars as well, such as an alignment toolbar used to align selected SIBs, a space and nudge toolbar used to arrange SIBs in the canvas object 1202, or a zoom and pan toolbar used to change the view of the canvas object.

Figure 13:
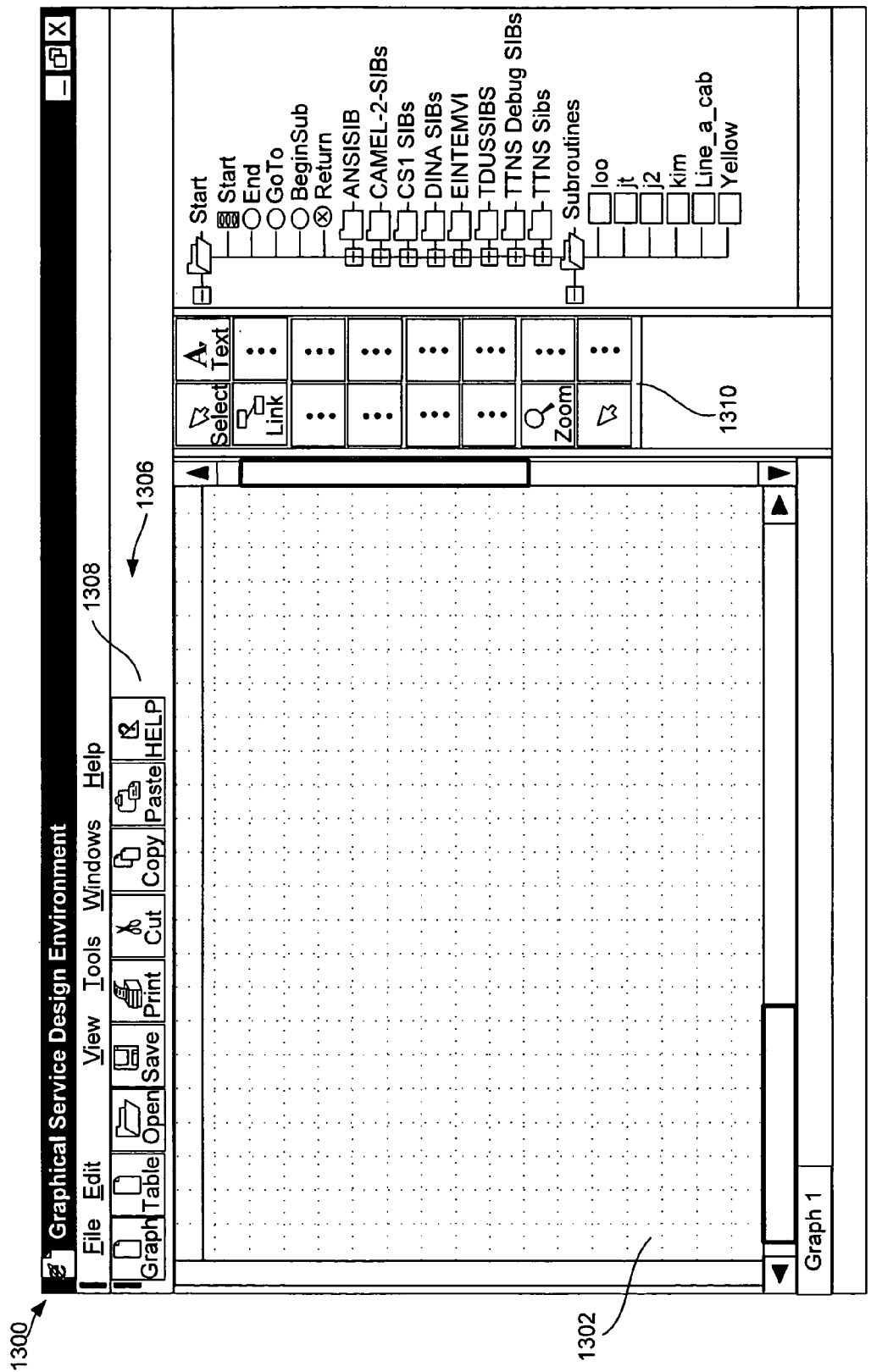
FIG. 13 shows a graphical design window displayed by the graphical interface program of FIG. 2 including working folder tabs and toolbars positioned in different locations within the window according to another embodiment of the present invention.

The toolbar object 1216 along with the various toolbars that may be included in that object may be positioned in different locations within the graphical design window 1200, as may the working folder tabs object 1204 and canvas object 1202. The sizes of each of these objects 1202, 1204 and 1216 may also be varied. FIG. 13 shows a graphical design window 1300 displayed by the graphical interface program 206 including a canvas object 1302, working folder tabs object 1304, and toolbars object 1306 including a standard toolbar 1308 positioned above the canvas object and a graph toolbar 1310 positioned between the canvas object and working folder tabs object according to another embodiment of the present invention. In the embodiment of FIG. 13, each toolbar 1308, 1310 is displayed in a large button mode in which a short label in addition to an icon is displayed for each of the button in the toolbars.

Figure 14:
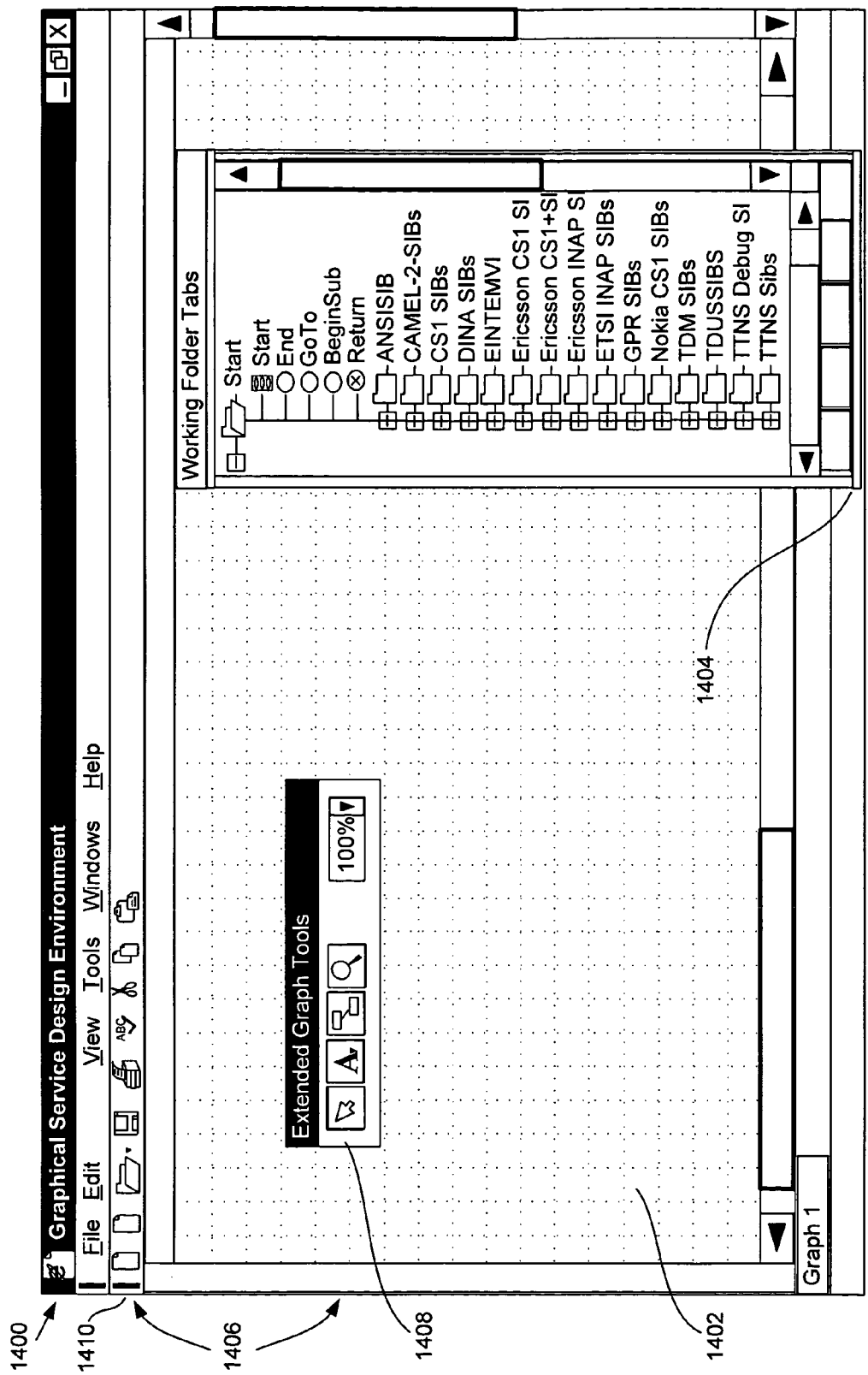
FIG. 14 shows a graphical design window displayed by the graphical interface program of FIG. 2 including undocked or floating toolbars and working folder tabs according to a further embodiment of the present invention.

FIG. 14 shows a graphical design window 1400 displayed by the graphical interface program 206 of FIG. 2 including a canvas object 1402 and an undocked or floating working folder tabs object 1404, along with a toolbar object 1406 including a floating graph toolbar 1408 and an undocked or fixed standard toolbar 1410. The standard toolbar 1410 as well as the working folder tabs object 1304 and toolbars 1308 and 1310 of FIG. 13 are said to be fixed or "docked" because they are in a fixed position relative to the associated canvas objects 1302 and 1402. In contrast, the working folder tabs object 1404 and graph toolbar 1408 are referred to as being undocked or floating since they may be moved around to different locations relative to the canvas object 1402. The floating working folder tabs object 1404 and toolbar 1408 always remain in front of the graphical design window 1400 so that they are not hidden behind this window.

Figure 15:
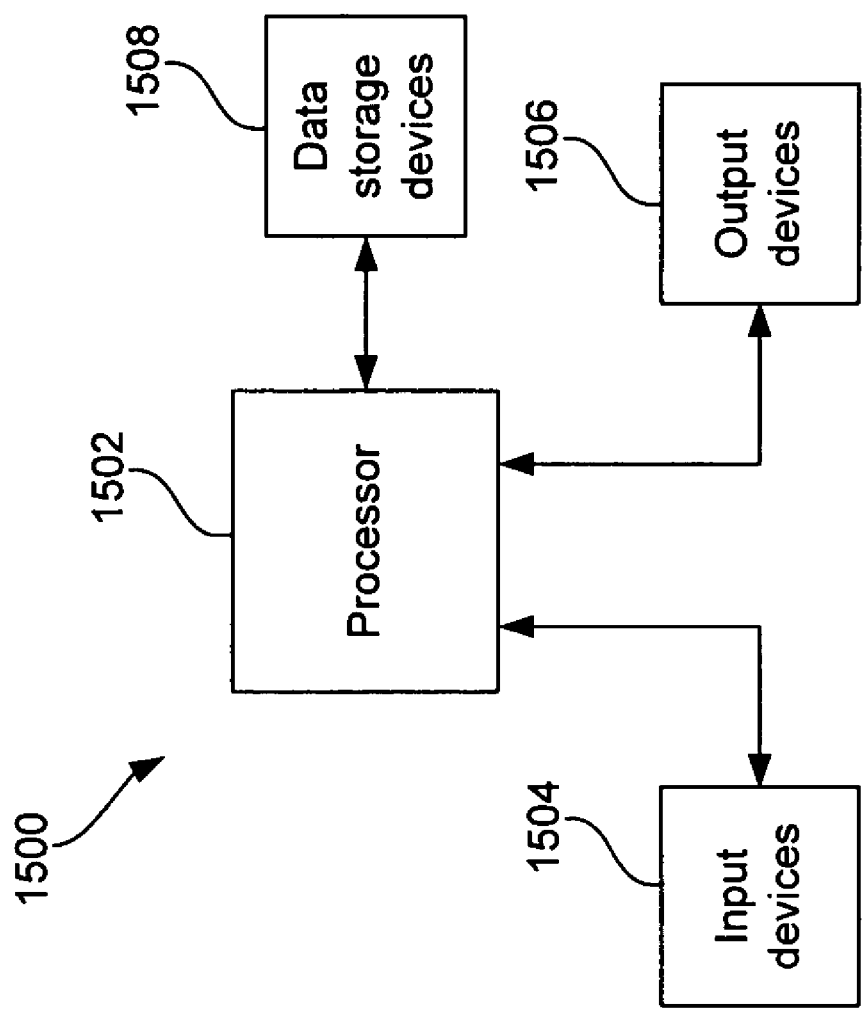
FIG. 15 is a functional block diagram illustrating a computer system corresponding to the client system of FIG. 2 according to one embodiment of the present invention.

FIG. 15 is a functional block diagram of a computer system 1500 corresponding to the client system 204 of FIG. 2 according to one embodiment of the present invention. The computer system 1500 includes a processor 1502 for performing various computing functions and for executing the graphical service design program 202 and associated programs 216, 222 and 224, as well as for executing other software to perform specific calculations or tasks. In addition, the computer system 1500 includes one or more input devices 1504, such as a keyboard or a mouse, coupled to the processor 1502 to allow an operator to interface with the computer system. Typically, the computer system 1500 also includes one or more output devices 1506 coupled to the processor 1502, such as a printer and a video display or monitor. One or more data storage devices 1508 are also typically coupled to the processor 1502 to store data or retrieve data from external storage media (not shown). Examples of typical storage devices 1508 include hard and floppy disks, tape cassettes, compact disk read-only (CD-ROMs) and compact disk read-write (CD-RW) memories, and digital video disks (DVDs).

One skilled in the art will understood that even though various embodiments and advantages of the present invention have been set forth in the foregoing description, the above disclosure is illustrative only, and changes may be made in detail, and yet remain within the broad principles of the invention. For example, the sequence of operations in the various processes described above may be varied, and the client and server computer systems may each be contained on a single computer or on a network of suitably connected computers, and also may be contained on a variety of different types of computer systems running a variety of different operation systems. Moreover, concepts and principles of the present invention may be applied to other types of telecommunications systems. Therefore, the present invention is to be limited only by the appended claims.

What is claimed is:

1. In a graphical user interface for a computer, a method of displaying objects for designing a service graph using a plurality of service independent building blocks, the method comprising:

displaying a canvas object;
    displaying a toolbar object;
    displaying a menu object; and
    displaying a working folder tabs object that displays in one mode service independent building blocks that may be placed onto the canvas to design a service graph, and wherein displaying the working folder tabs object further comprises:
        displaying icons representing service graphs in a second mode, wherein displaying icons representing service graphs in second mode further comprises displaying icons representing subroutine graphs;
        displaying icons representing service data tables in a third mode; and
        displaying icons representing message sets and messages in a fourth mode.

2. The method of claim 1 wherein the canvas object is displayed in a lower right hand portion of a graphical design window, the working folder tabs object is displayed adjoining the canvas object on the left, and the toolbar object is displayed above the canvas object.

3. The method of claim 1 wherein the canvas object is displayed in lower left hand portion of a graphical design window, the working folder tabs object is displayed adjacent the canvas object on the right, and the toolbar object includes a first toolbar object is displayed above the canvas object and a second toolbar object is displayed between the canvas object and the working folder tabs object.

4. The method of claim 1 wherein the canvas object is displayed across a center portion of a graphical design window and wherein the working folder tabs object is floating and displayed over the canvas object and wherein a toolbar object is floating and displayed over the canvas object.

5. The method of claim 1 wherein each of the modes is displayed responsive to user input.

6. The method of claim 1 wherein displaying the toolbar object comprises displaying a plurality of buttons on the toolbar object, each button controlling objects displayed in the graphical design window.

7. The method of claim 6 wherein displaying the toolbar object further comprises displaying text for each button along with a button icon.

8. A computer-readable medium having stored thereon computer-readable data for displaying objects for designing a service graph using a plurality of service independent building blocks by performing the operations of:
   displaying a canvas object;
   displaying a toolbar object;
   displaying a menu object; and
   displaying a working folder tabs object that displays in one mode service independent building blocks that may be placed onto the canvas to design a service graph, and wherein displaying the working folder tabs object further comprises:
      displaying icons representing service graphs in a second mode, and wherein displaying icons representing service graphs in the second mode further comprises displaying icons representing subroutine graphs;
      displaying icons representing service data tables in a third mode; and
      displaying icons representing message sets and messages in a fourth mode.

9. The computer-readable medium of claim 8 wherein the canvas object is displayed in a lower right hand portion of a graphical design window, the working folder tabs object is displayed adjoining the canvas object on the left, and the toolbar object is displayed above the canvas object.

10. The computer-readable medium of claim 8 wherein the canvas object is displayed in lower left hand portion of a graphical design window, the working folder tabs object is displayed adjacent the canvas object on the right, and toolbar object includes a first toolbar object displayed above the canvas object and a second toolbar object displayed between the canvas object and the working folder tabs object.

11. The computer-readable medium of claim 8 wherein the canvas object is displayed across a center portion of a graphical design window and wherein the working folder tabs object is floating and displayed over the canvas object and wherein the toolbar object is floating and displayed over the canvas object.

12. A computer system, comprising:
   a processor for executing a graphical interface program that operates to design service graphs for telecommunications services; and
   a display coupled to the processor, the graphical interface program operable to control the display to provide a graphical user interface including a canvas object, a toolbar object, a menu object, and a working folder tabs object that displays in one mode service independent building blocks that may be placed onto the canvas to design a service graph and displays in a second mode icons representing subroutine graphs, and wherein the program operates to control the mode of the working folder tabs object responsive to user input, wherein the mode determines what is displayed by the working folder tabs object.

13. The computer system of claim 12 wherein the computer system further comprises input devices, output devices, and data storage devices coupled to the processor, and wherein the program controls the mode of the working folder tabs object to place the object in one of a service graph mode during which the display displays icons representing service graphs, a service data table mode during which the display displays icons representing service data tables, and a message mode during which the display displays icons representing message sets and messages.

14. The computer system of claim 12 wherein the display provides the canvas object in a lower right hand portion of a graphical design window, the working folder tabs object adjacent the canvas object on the left, and the toolbar object above the canvas object.

15. The computer system of claim 12 wherein the display provides the canvas object in a lower left hand portion of a graphical design window, the working folder tabs object adjacent the canvas object on the right, and a first toolbar object above the canvas object and a second toolbar object between the canvas object and the working folder tabs object.

16. The computer system of claim 12 wherein the display provides the canvas object across a center portion of a graphical design window and wherein the working folder tabs object is floating and displayed over the canvas object and wherein the toolbar object is floating and displayed over the canvas object.

17. In a graphical user interface for a computer, a method of displaying objects for designing a service graph using a plurality of service independent building blocks, the method comprising:
   displaying a canvas object;
   displaying a toolbar object;
   displaying a menu object; and
   displaying a working folder tabs object that displays in one mode service independent building blocks and in another mode service subroutine icons representing subroutine graphs that may be placed onto the canvas to design a service graph, and wherein displaying the working folder tabs object further comprises:
      displaying icons representing service graphs in a third mode;
      displaying icons representing service data tables in a fourth mode; and
      displaying icons representing message sets and messages in a fifth mode.

18. The method of claim 17 wherein the canvas object is displayed in a lower right hand portion of a graphical design window, the working folder tabs object is displayed adjoining the canvas object on the left, and the toolbar object is displayed above the canvas object.

19. The method of claim 17 wherein the canvas object is displayed in lower left hand portion of a graphical design window, the working folder tabs object is displayed adjacent the canvas object on the right, and the toolbar object includes a first toolbar object is displayed above the canvas object and a second toolbar object is displayed between the canvas object and the working folder tabs object.

20. The method of claim 17 wherein the canvas object is displayed across a center portion of a graphical design window and wherein the working folder tabs object is floating and displayed over the canvas object and wherein a toolbar object is floating and displayed over the canvas object.

\* \* \* \* \*